United States Patent
Lu et al.

(10) Patent No.: US 10,902,626 B2
(45) Date of Patent: Jan. 26, 2021

(54) PREVENTING INTRUSION DURING VIDEO RECORDING OR STREAMING

(71) Applicant: INTERNATIONAL BUSINESS MACHINES CORPORATION, Armonk, NY (US)

(72) Inventors: Fang Lu, Shanghai (CN); Dan Zhang, Shanghai (CN); Jing Ran Yang, Shanghai (CN); Ye Xu, Shanghai (CN); Ke Huan Yin, Ningbo (CN); Tai Mei Zhang, Hangzhou (CN)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 15/950,228

(22) Filed: Apr. 11, 2018

(65) Prior Publication Data
US 2019/0318496 A1 Oct. 17, 2019

(51) Int. Cl.
*G06T 7/70* (2017.01)

(52) U.S. Cl.
CPC ...... *G06T 7/70* (2017.01); *G06T 2207/10016* (2013.01); *G06T 2207/20224* (2013.01); *G06T 2207/30242* (2013.01)

(58) Field of Classification Search
None
See application file for complete search history.

(56) References Cited

U.S. PATENT DOCUMENTS

| 6,823,011 | B2 | 11/2004 | Divakaran et al. |
| 7,483,062 | B2 | 1/2009 | Allman et al. |
| 2005/0041109 | A1 | 2/2005 | Juhler |
| 2005/0077470 | A1 | 4/2005 | Tichit et al. |
| 2015/0022698 | A1* | 1/2015 | Na ............ H04N 5/23222 348/241 |
| 2018/0249091 | A1* | 8/2018 | Ding ............ H04N 5/23232 |
| 2019/0287225 | A1* | 9/2019 | Amirghodsi ...... G06K 9/6215 |

FOREIGN PATENT DOCUMENTS

| CN | 105191287 A | 12/2015 |
| CN | 106303333 A | 1/2017 |

OTHER PUBLICATIONS

Removing undesirable objects from photos, An ip.com prior art database technical disclosure, IP.com No. IPCOM000143880D, Dec. 12, 2006.*
Mell et al., "The NIST Definition of Cloud Computing", Recommendations of the National Institute of Standards and Technology, Special Publication 800-145, Sep. 2011, 7 pages.
(Continued)

*Primary Examiner* — Vikkram Bali
(74) *Attorney, Agent, or Firm* — L. Jeffrey Kelly

(57) ABSTRACT

According to one or more embodiments, a method, a computer program product, and a computer system for preventing intrusion during video recording or streaming are provided. According to the method, at first, a camera of a device may capture a scene into a video, then the device may store frame-series images of the video into a cache. The device may then detect whether there is at least one intruder in the scene, and then in response to the at least one intruder being detected in the scene, the device may eliminate the at least one intruder from the cached frame-series images.

18 Claims, 11 Drawing Sheets

(56) References Cited

OTHER PUBLICATIONS

Saranga, "After Effects tutorial: Remove moving objects from video", Intro, Sep. 4, 2013, 3 pages.
Saranga, "After Effects tutorial: Remove moving objects from video", Step 12, Sep. 4, 2013, 2 pages.
Singh et al., "A New Algorithm Designing for Detection of Moving Objects in Video", Abstract, International Journal of Computer Applications (0975-8887), vol. 96—No. 2, Jun. 2014, 8 pages.

* cited by examiner

PREVENTING INTRUSION DURING VIDEO RECORDING OR STREAMING

BACKGROUND

The present invention relates to the field of video technology, and more particularly, to video processing.

With the rapid development of intelligent mobile terminals and mobile internet technology, it has become increasingly popular for users to record or stream video of their life by using their smartphones, tablets, or digital cameras, etc. and to share their videos on social media network.

SUMMARY

Embodiments of the present invention disclose a method, system, and computer program product for preventing intrusion during video recording or streaming. According to one embodiment, a method for preventing intrusion during video recording or streaming is provided. According to the method, at first, a camera of a device may capture a scene into a video, then the device may store frame-series images of the video into a cache. The device may then detect whether there is at least one intruder in the scene, and then in response to the at least one intruder being detected in the scene, the device may eliminate the at least one intruder from the cached frame-series images.

According to another embodiment, a computer for preventing intrusion during video recording or streaming is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. According to the method, at first, a camera of a device may capture a scene into a video, then the device may store frame-series images of the video into a cache. The device may then detect whether there is at least one intruder in the scene, and then in response to the at least one intruder being detected in the scene, the device may eliminate the at least one intruder from the cached frame-series images.

According to yet another embodiment, a computer program product for preventing intrusion during video recording or streaming is provided. The computer program product may include one or more computer-readable storage devices and program instructions stored on at least one of the one or more tangible storage devices, the program instructions executable by a processor. The program instructions are executable by a processor for performing a method. According to the method, at first, a camera of a device may capture a scene into a video, then the device may store frame-series images of the video into a cache. The device may then detect whether there is at least one intruder in the scene, and then in response to the at least one intruder being detected in the scene, the device may eliminate the at least one intruder from the cached frame-series images.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
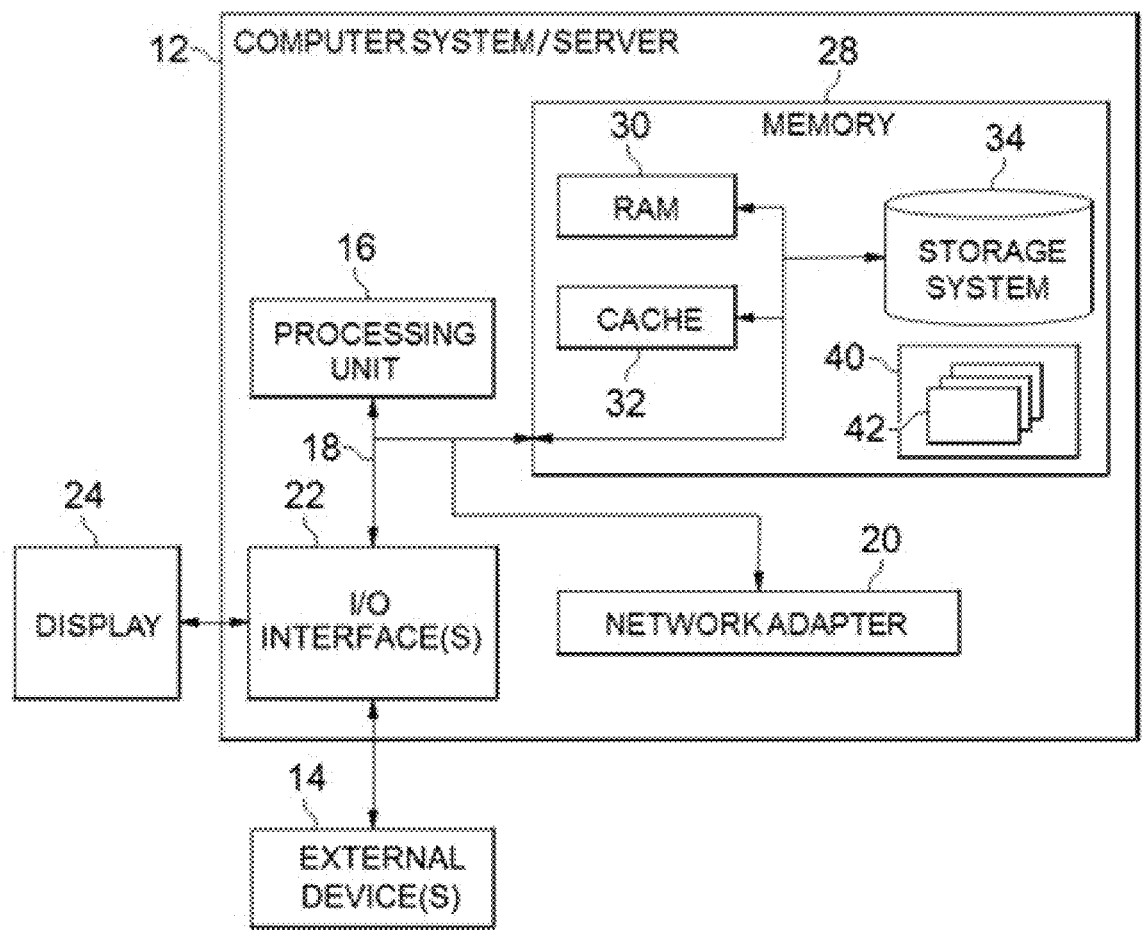
FIG. 1 depicts a cloud computing node according to an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of video technology, and more particularly, to video processing. The following described exemplary embodiments provide a system, method and program product to, among other things, prevent and eliminate intrusion by outside parties during the capture, recording, or streaming of video. Therefore, embodiments of the present invention have the capacity to improve the field of video technology by allowing users to remove intruders from a captured video in situ.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

It may be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that may be accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Now it has become increasingly popular for users to video their life by using their devices such as smart phones, tablets, or digital cameras, etc. and to share their videos on social media network. However, during the process of taking a video, there are often some unrelated objects who enter the scenes. These unrelated objects are hereinafter referred to as "intruders" who are not expected by the users and should be excluded in the video. Usually, users do not like such scenes. In the existing arts, there are several solutions for a user to solve this problem. The first solution may be to take a video again, which may inevitably waste the user to expend more time. In addition, these fleeting moments can never come back for the user. The second solution may be to switch focal length of a camera of the user's device, but the user may not notice the intruders since he/she focuses on the scene, and it may be possible for the user to forget to switch the focal length during video capture (i.e., streaming or recording). Besides, if the intruders are not in the marginal of images of the video, it may not be possible for the user to eliminate the intruders by switching the focal length during videoing. The third solution may be to process the frames of the video using a specific image processing application/software after videoing, which may need user's additional time and special effort to learn the skill. Thus, there may be a need for a device to be able to automatically eliminate the intruders during videoing.

Figure 2:
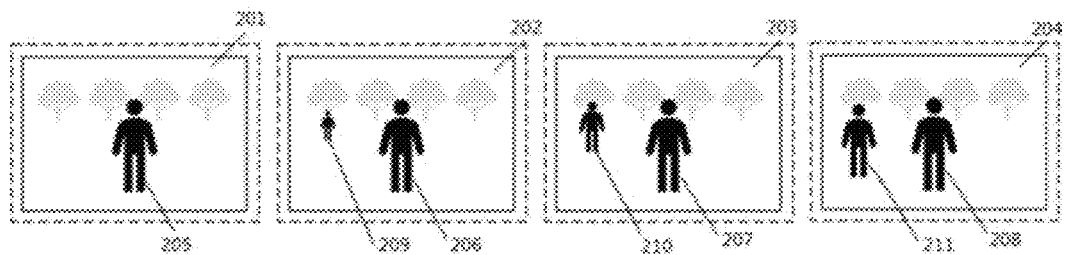
FIG. 2 depicts exemplary frame-series images of a video from a general purpose camera of a device.

FIG. 2 depicts exemplary frame-series images of a video taken by a general-purpose camera of a device. Referring to FIG. 2, a scene may be recorded into a video with frame-series images. In the frame-series images, the first image may be designated generally by the reference number 201 and is hereinafter referred to as "image 201", and the second image, the third image and the forth image are hereinafter referred to as "image 202", "image 203", "image 204" respectively. The following other figures in this disclosure use this kind of representation. Notably, a video may comprise a plurality of frame-series images, while frame-series images may comprise a plurality of frames/images. Accordingly, the frame-series images in this example, may comprise four frames, in other words, four images. In each image of the frame-series images, objects 205-208 are used to describe a same person to be captured into the video, e.g. to be videoed, or to be included in the scene by a user in images 201-204 of the video respectively, and objects 209-211 are used to describe a same intruder in images 202-204 of the video respectively. A user may want to take a video in which the person (who may be the same person referred to as 206-208 in images 201-204 of the video respectively) may be included and the intruder (who may be the same intruder referred to as 209-211 in images 202-204 of the video respectively) may be excluded. It will be further understood that the person to be included or the intruder in the scene may be other objects, such as pets, sceneries, etc. Although the focus of this invention may be to take a video for people, it can be understood the methods for videoing people without intruders can be used to video other scenes. It may be noted that there may be one or more objects to be included in the scene, and there may be one or more intruders. For ease of illustration, one person to be included in the scene and one intruder may be generally used in the following embodiments.

Figure 3:
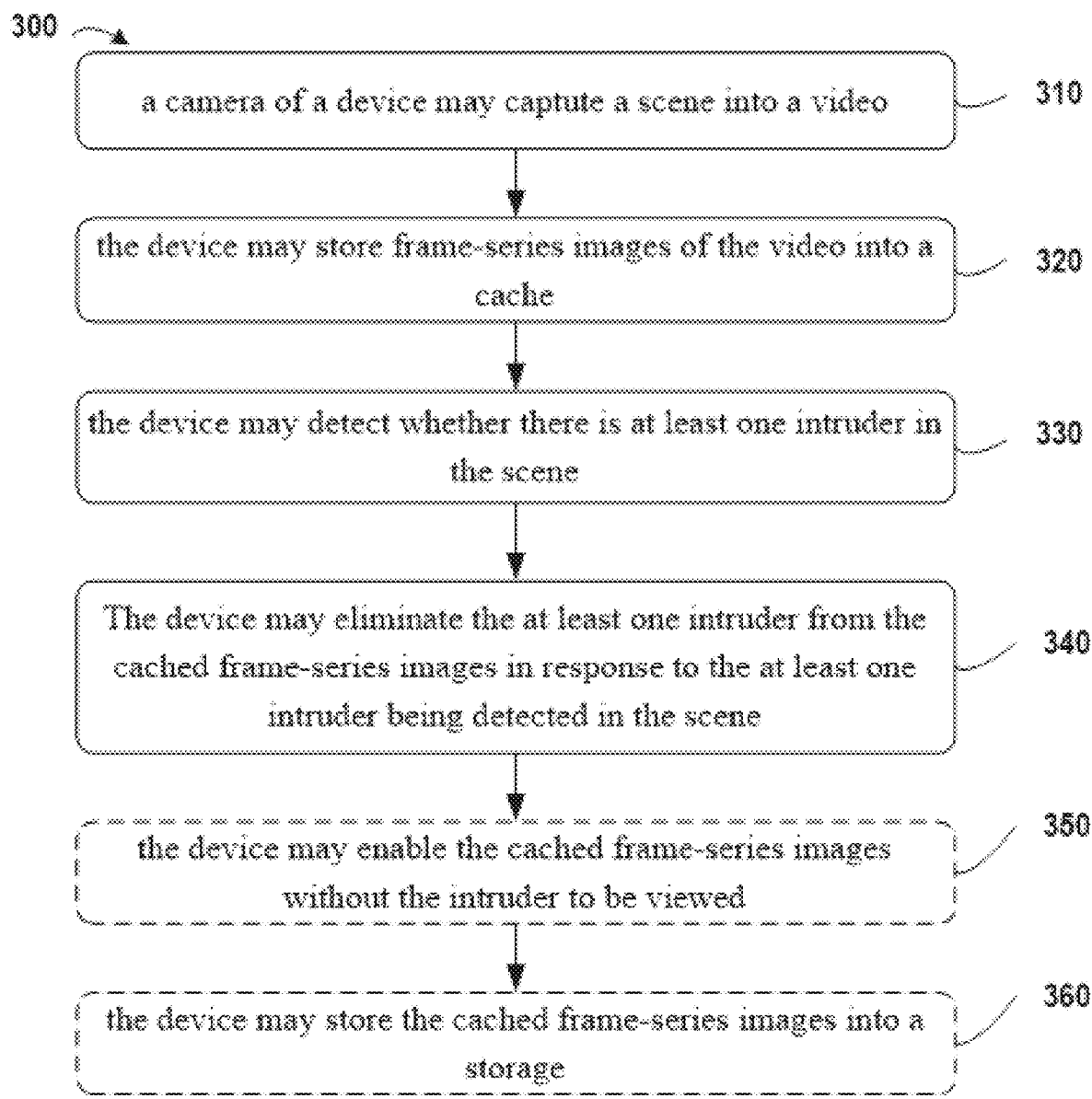
FIG. 3 depicts a flow diagram illustrating a method 300 for eliminating intruders during video capture according to one or more embodiments of the present disclosure.

FIG. 3 depicts a flow diagram illustrating a method 300 for eliminating intruders during videoing according to one or more embodiments of the present disclosure. It may be assumed that the mode implementing method 300 on a device may be hereinafter referred to as "No intruder" mode which can be activated by the user of the device during videoing, for example, press a button on the display screen. It can also be understood that the "No intruder" mode can be activated by the user before a video may be started to be taken or at any time during videoing.

Referring to FIG. 3, once the "No intruder" mode may be activated, a camera of a device may capture a scene into a video at 310, then the device may store frame-series images of the video into a cache at 320. The device may then detect whether there may be at least one intruder in the scene at 330, here the at least one intruder may be at least one person who should be excluded in the video. In response to the at least one intruder being detected in the scene, the device may then eliminate the at least one intruder from the cached frame-series images at 340.

Continuing with the diagram of FIG. 3, once the "No intruder" mode may be activated, the scene may be captured by the camera of the device and frame-series images of the video may be stored into a cache instead of a storage of the device at 310 and 320. The cache may be a temporary storage for part of the video, e.g. frame-series images. The frame-series images may comprise an intruder(s) or not. If there is no intruder in the frame-series images, the frame-series images can be stored directly into a permanent storage as part of the video, otherwise, the intruder(s) can be eliminated from images with the intruder(s) in the frame-series images. In an embodiment, the device may enable the cached frame-series images without the intruder(s) to be viewed at 350. For example, the cached frame-series images without the intruder(s) may be displayed on a sub-window of the display screen of the device so that the user can view the cached frame-series images without the intruder(s) and determine whether it may be acceptable. In an embodiment, the device may store the modified frame-series images into the permanent storage as part of the video at 360.

In the following embodiments, it may be assumed that there may be one person to be included in the scene at the beginning of the "No intruder" mode being activated, and an intruder will be captured during videoing.

Continuing with the diagram of FIG. 3, there are several solutions to implement the step at 330 in accordance with one or more embodiments. However, in each solution, the device may firstly determine the person to be included in the scene, then may determine whether there may be other person included in the scene. If the device determines that there may be the other person in the scene, then the device can determine the other person to be the intruder. Otherwise, the device can determine that there may be no intruder in the scene.

In some embodiments, the person to be included in the scene can be indicated by the user of the device. For example, once the "No intruder" mode may be activated, a user can use a touch screen of the device to input/indicate the person to be included in the scene, such as drawing a closed curve for each person to be included in the scene, then the face or the contour of the person can be recognized and tracked. In some embodiments, the intruder can also be detected by user's indication, such as drawing a closed curve for the intruder, then the face or the contour of the intruder can be recognized and tracked.

Figure 4A:
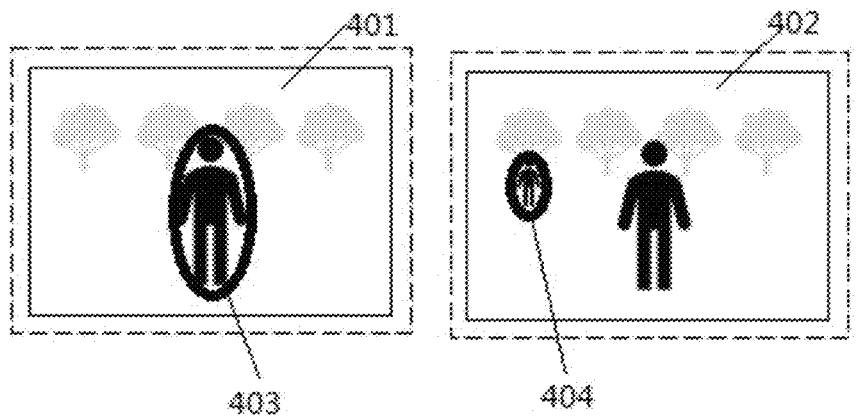
FIG. 4A and FIG. 4B depicts exemplary frame-series images of a video displayed on a screen of the device in which both a person to be included in the scene and an intruder are indicated by a user.
Figure 4B:
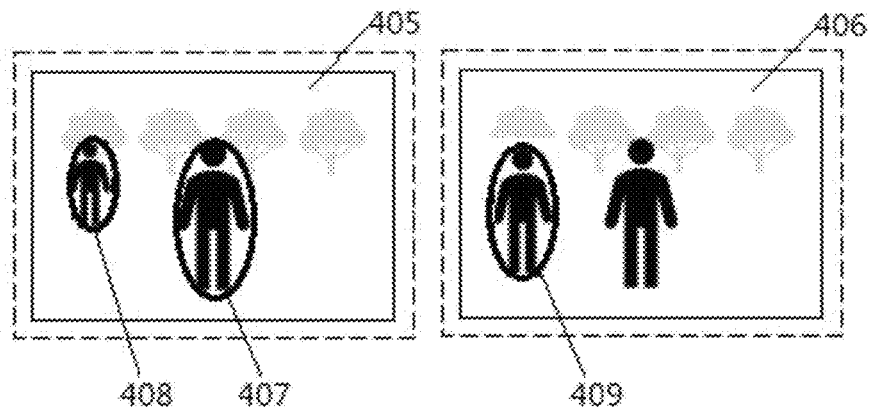

FIG. 4A and FIG. 4B depicts exemplary frame-series images of a video which can be displayed on a screen of the device, in which both a person to be included in the scene and an intruder are indicated by a user. Referring to FIG. 4A, these two images, e.g. images 401-402, show the frame-series images of the video where the "No intruder" mode can be activated by the user before the video may be started to be taken. In image 401, there may be no intruder at all. To determine the person to be included in the scene or the intruder, a closed curve 403 may be drawn by the user on the display screen on which the first image 401 of the frame-series images can be displayed, to indicate that the person to be included in the scene may be in closed curve 403, and then the face or the contour of the person to be included in the scene in closed curve 403 can be recognized. A closed curve 404 may be drawn by the user on the display screen on which image 402 of the frame-series images can be displayed, to indicate that the intruder may be in closed curve 404, and then the face or the contour of the intruder in closed curve 404 can be recognized.

Referring to FIG. 4B, these two images 405-406 may show the frame-series images of the video where the "No intruder" mode can be activated by the user at any time during videoing. In image 405, there may be an intruder 408. To determine the person to be included in the scene or the intruder, a closed curve 407 may be drawn by the user on the display screen on which image 405 of the frame-series images can be displayed, to indicate that the person to be included in the scene may be in closed curve 407, and then the face or the contour of the person in closed curve 407 can be recognized. Closed curves 408-409 may be drawn by the user on the display screen on which images 405-406 of the frame-series images can be displayed respectively, to indicate that the intruder may be in closed curves 408-409, and then the face or the contour of the intruder in closed curves 408-409 can be recognized.

It can be understood that the closed curve drawn by the user on the display screen may be just an exemplary implementation for user to input/indicate both the person to be included in the scene and the intruder, any other implementation can be used by the user too.

In order to determine the person to be included in the scene or the intruder, in some embodiments, image processing technology can be used. For example, in the scenario of FIG. 4A, once the "No intruder" mode may be activated, in one example, the device can directly recognize the face of the person in image 401 of frame-series images to be the person to be included in the scene by face recognition technology. In another example, the device can directly recognize human contour of the person in image 401 of frame-series images to be the person to be included in the scene by human contour recognition technology. Still in the scenario of FIG. 4A, all persons in the scene can be determined by processing each other frame of the frame-series images using either face recognition technology or human contour recognition technology. If the device determines that there may be other person, and the other person may not be the person to be included in the scene by comparing the face or human contour of the other person with that of the person to be included in the scene, then the device can determine that the other person may be the intruder.

In some embodiments, face recognition and tracking or human body contour recognition and tracking can be used to process each frame in the frame-series images. Image tracking can save computing resource. It also can be understood in this disclosure that if the frame-series images are color images, they can be transformed into gray scale image to save computing resource.

In some embodiments, it may be assumed that the intruder may be a moving object while the person to be included in the scene may be a static object, such as the person to be included in the scene may be standing in a fixed area, or the scenery may be the object to be included in the scene, etc. Thus the moving object detection technology for frames can be used to detect the intruder. How to detect and track a moving object in the frame-series images may be well known technology for those skilled in the art, so the implementation details are omitted here.

Figure 5:
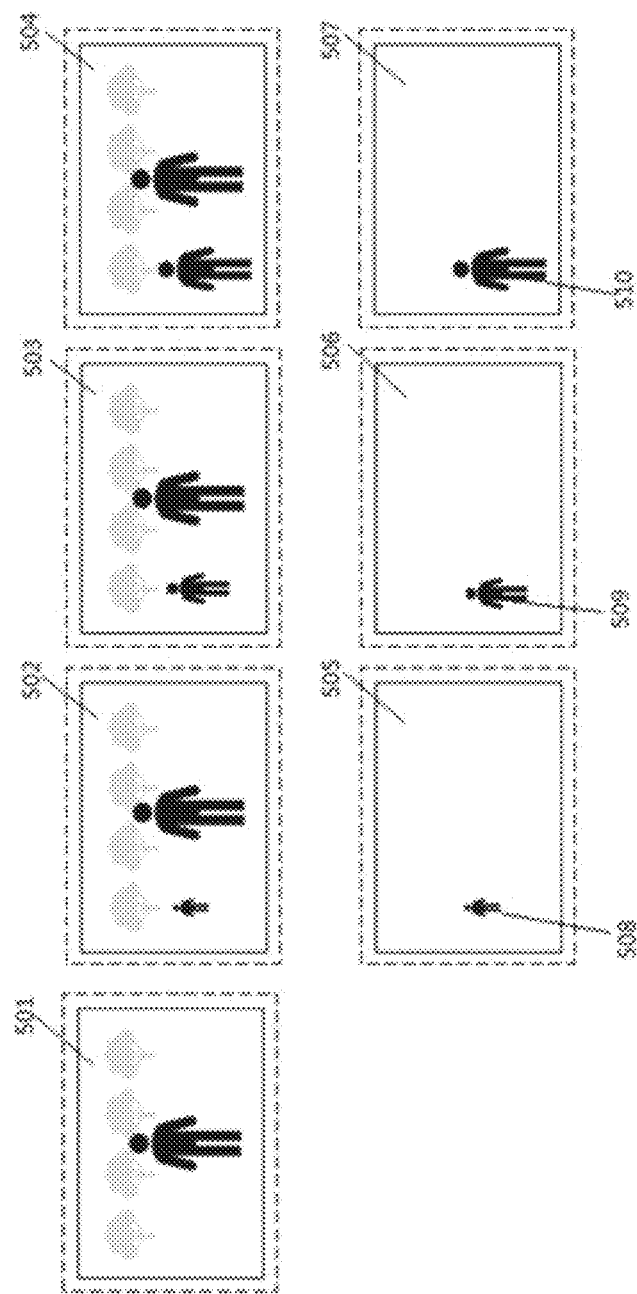
FIG. 5 depicts exemplary frame-series images of a video and its corresponding frame-series images without background.

In some embodiments, it may be assumed that the intruder may be a moving object while the background including the person to be included in the scene may be a static object. Accordingly, the intruder can be determined through monitoring background characteristics in the scene by processing the frame-series images. For example, FIG. 5 depicts exemplary frame-series images of a video and their corresponding frame-series images without background. Referring to FIG. 5, images 501-504 are exemplary frame-series images of a video, and there may be one intruder in the scene, and the intruder may be referred to as 508-510 in images 505-507 respectively. Here image 501 can be used as the background with the person to be included in the video, and images 502-504 are processed to remove the background image to obtain images 505-507. Then the intruder (referred to as 508-510 in images 505-507 respectively, and 508-510 refer to the same person in different images) can be determined from images 505-507 using image processing technology.

Figure 6:
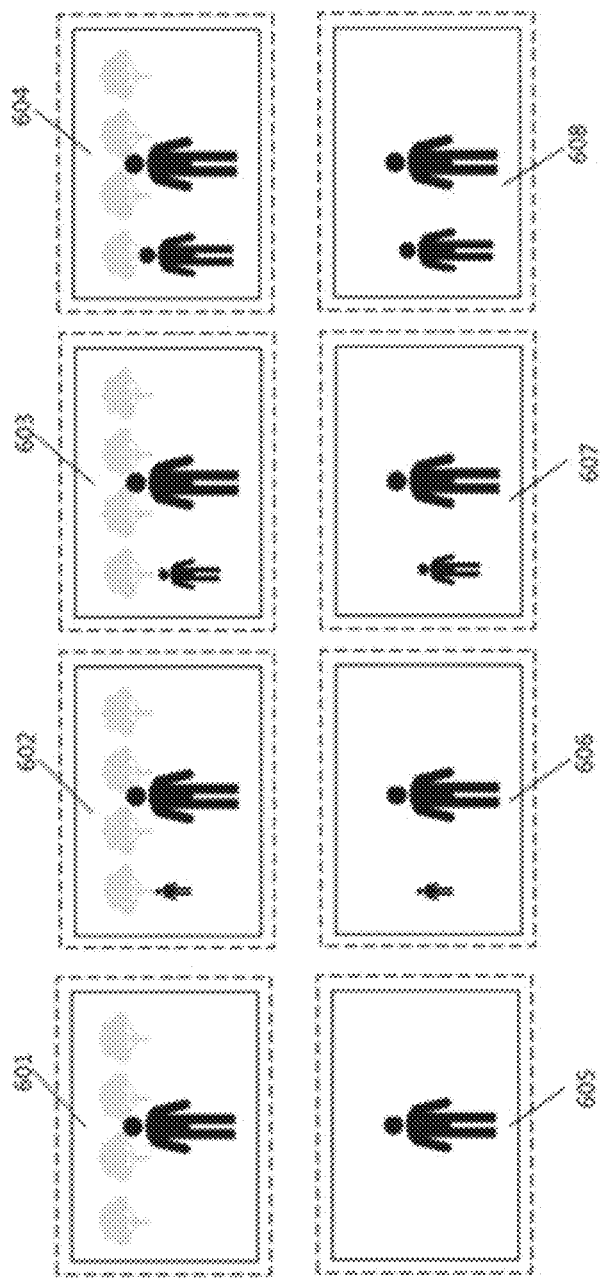
FIG. 6 depicts exemplary frame-series images from a general-purpose camera of the device and their corresponding frame-series images from an infrared camera of the device.

In some embodiments, it may be assumed that there may be an infrared camera on the device besides the general-purpose camera. The infrared camera can sense a hot object and image the contour of the object based on the temperature of the hot object. A human being may be a hot object that can be detected by the infrared camera. The captured windows for both the infrared camera and the general-purpose camera are a little different, but their main contexts are substantially the same. Therefore, frame-series images taken by the infrared camera can be used to determine the intruder. For example, FIG. 6 depicts exemplary frame-series images from a general-purpose camera of the device and their corresponding frame-series images taken by an infrared camera of the device. Referring to FIG. 6, images 601-604 are frame-series images taken by the general-purpose camera while images 605-608 are frame-series images taken by the infrared camera for the similar scenes. In this regard, it can be understood that images 605-608 can be processed in substantially the same manner as images 601-604 except the face recognition, such as moving object detection, object contour recognition and tracking, background characteristics monitoring, and the like. It will save a lot of computing cost by processing images 605-608 instead of processing images 601-604.

In a simplified example, referring to FIG. 6, a first image of the frame-series images, e.g. image 601, can be determined as a reference image in which there may be an object to be included in the scene. The number of the object(s) to be included in the scene in the reference image can be determined as a first count, for example, the first count may be 1 in image 601. The number of object(s) included in the scene in a second image of the frame-series images, for example, in image 602, can be determined as a second count. If the second count may be bigger than the first count, it can be determined that there may be at least one intruder in image 602. Images 603-604 can be processed similarly. This method can reduce computing resource of the image processing. In order to further reduce computing resource of the above image processing, the similar processing can be done to the frame-series images taken by the infrared camera. In another example, a first image of the frame-series images taken by the infrared camera, e.g. image 605, can be determined as a reference image in which there may be an infrared detectable object to be included in the scene. The number of the infrared detectable object(s) to be included in the scene in the reference image can be determined as a first count, for example, the first count may be 1 in image 605. The number of infrared detectable object(s) included in the scene in a second image of the frame-series images taken by the infrared camera, for example, in image 606, can be determined as a second count. If the second count is bigger than the first count, it can be determined that there may be at least one intruder in image 606. Images 607-608 can be processed similarly.

In some embodiment, the above implementations for detecting the intruder can be combined. For example, considering the following scenario: there is one person to be included in the scene at the beginning of the "No intruder" mode being activated, and after a while, an intruder may enter the scene and then a second person who is also the person to be included in the scene may enter the scene. In order to record the video without the intruder, the first person to be included in the scene and the intruder can be detected using any method described above, such as moving object detection, face recognition and tracking, human body contour recognition and tracking, background characteristics monitoring in the scene, etc. while the second person to be included in the scene may be input/indicated by the user. Also, those skilled in the art can think out other combinations of the above implementations to adapt to other scenarios.

Referring back to the diagram of FIG. 3, there are several solutions to implement the step at 340 in accordance with one or more embodiments. In some embodiments, one image taken by the cached frame-series images can be determined as a reference image in which there may be no intruder. For any one image to be processed with at least one intruder in the cached frame-series images, following actions can be taken: at least one contour of the at least one intruder in the image to be processed can be determined firstly. At least one area covering the at least one contour respectively can be determined. Then at least one location associated with the at least one area can be determined. At last, pixels in the at least one location in the image to be processed can be replaced with pixels in the at least one location in the reference image.

Figure 7:
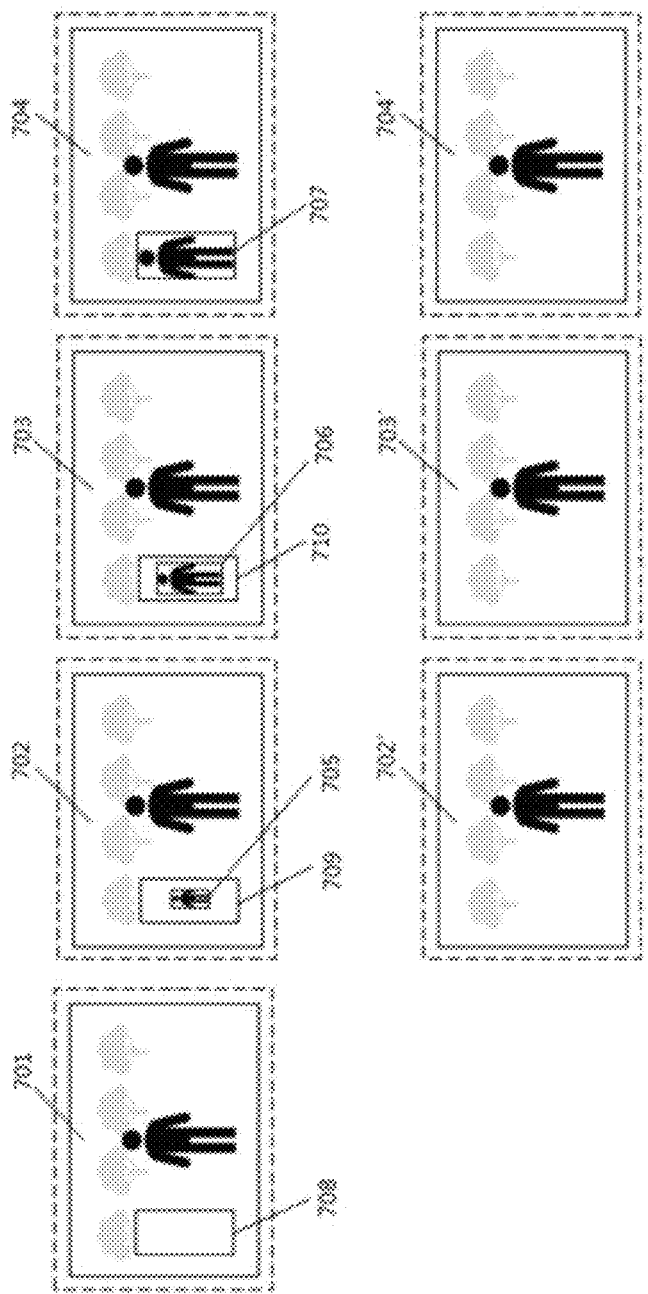
FIG. 7 depicts first exemplary frame-series images of a video for eliminating the intruder.

In some embodiments, FIG. 7 depicts first exemplary frame-series images of a video for eliminating the intruder. Referring to FIG. 7, images 701-704 are images taken by the general-purpose camera, and image 701 can be set as a reference image, while one intruder can be detected in each of images 702-704 in the exemplary frame-series images. The human body contour of the intruder in each of images 702-704 can be recognized respectively, and then the smallest rectangular area that can cover the human body contour of the intruder in each of images 702-704 can be determined to be blocks 705-707 respectively. It is determined that the smallest rectangular area 707 in image 704 can cover other two the smallest rectangular areas, e.g. blocks 705-706 in both images 702-703, so the block 707 can be defined as a replacing block and the location of the replacing block can be determined, and the location of block 707 have the same location with block 708 in image 701, block 709 in image 702, and block 710 in image 703 respectively. Then the device can replace pixels of block 709 in image 702, pixels of block 710 in image 703 and pixels of block 707 in image 704 with pixels in block 708 in a reference image 701 respectively to get images 702', 703' and 704'. Then the new frame-series images of a video without the intruder, e.g. images 701, 702', 703' and 704', can be stored into the permanent storage. It can be understood that any other block which is a little bigger than block 707 can be used as the replacing block.

Figure 8:
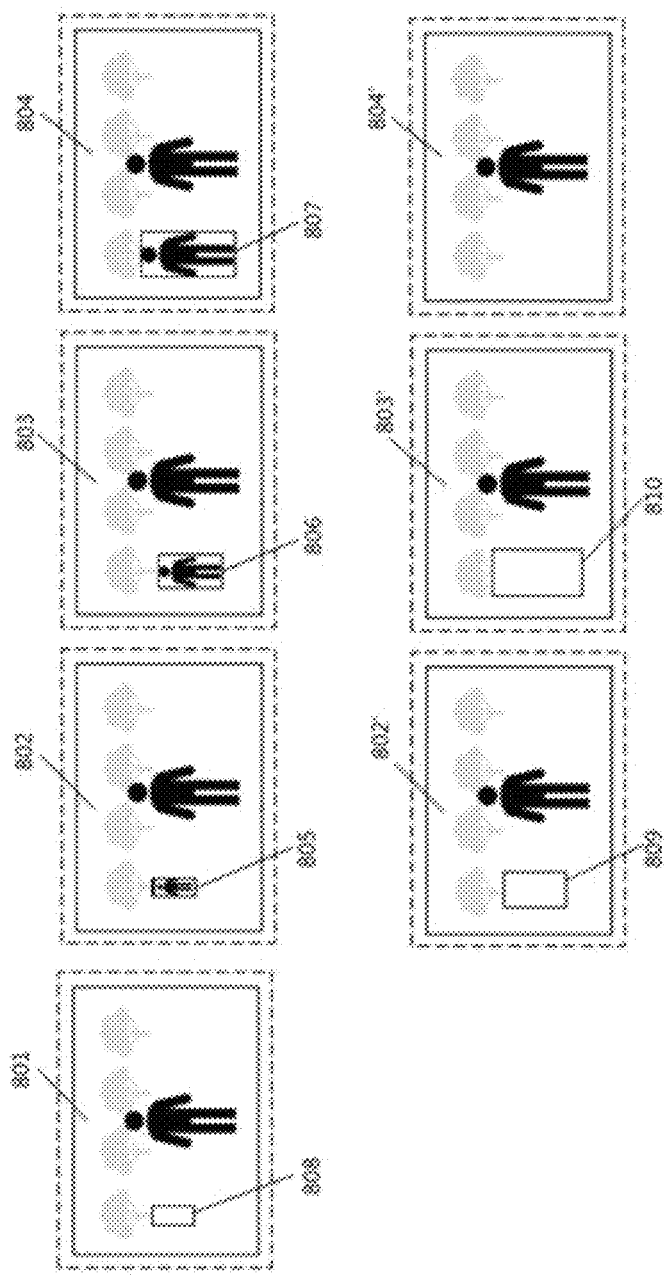
FIG. 8 depicts second exemplary frame-series images of a video for eliminating the intruder.

In some embodiments, the reference image is not fixed, but can be changeable. FIG. 8 depicts second exemplary frame-series images of a video for eliminating the intruder. Referring to FIG. 8, images 801-804 are images taken by the general-purpose camera, while one intruder can be detected in images 802-804 in the exemplary frame-series images. The human body contour of the intruder in each of images 802-804 can be recognized respectively, and then the smallest rectangular area that can cover the human body contour of the intruder in each of images 802-804 can be determined to be blocks 805-807 respectively. At first, image 801 can be set as the reference image, and block 808 in image 801 is in the same image location (pixel location) with block 805 in image 802, then the device can use block 808 as a replacing block to replace pixels of block 805 in image 802 with pixels in block 808 in reference image 801 to get image 802'. Second, image 802' can be set as the reference image, and block 809 in image 802' is in the same image location (pixel location) with block 806 in image 803, then the device can use block 809 as a replacing block to replace pixels of block 806 in image 803 with pixels in block 809 in reference image 802' to get image 803'. At last, image 803' can be set as the reference image, and block 810 in image 803' is in the same image location (pixel location) with block 807 in image 804, then the device can use block 810 as a replacing block to replace pixels of block 807 in image 804 with pixels in block 810 in reference image 803' to get image 804'. Then the new frame-series images of a video without the intruder, e.g. images 801, 802', 803' and 804', can be stored into the permanent storage. It can be understood that in each replacing step, any other block which is a little bigger than one of blocks 808-810 can be used as the replacing block.

It can be understood that either the human body contour or the smallest rectangular area of the contour of the intruder in each image of the frame-series images of a video can be obtained by processing the frame-series images taken by the infrared camera of the device, and how to get the smallest rectangular area of the contour of the intruder or the person to be included in the scene is well known by those skilled in the art.

It also can be understood that the smallest rectangular area is just an example which can be easily computed. Those skilled in the art can understand any other shape which can cover the human body contour of the intruder can be applied to present disclosure.

Another solution to implement the step at 340 in FIG. 3 can be disclosed in the followings. In some embodiments, for any one image to be processed in the cached frame-series images, wherein there is at least one intruder in the image to be processed, the following action can be taken: at first, at least one contour of the at least one intruder in the image to be processed can be determined. Then a region excluding the at least one contour in the image to be processed can be determined. At last a new image based on image in the region can be generated.

Figure 9:
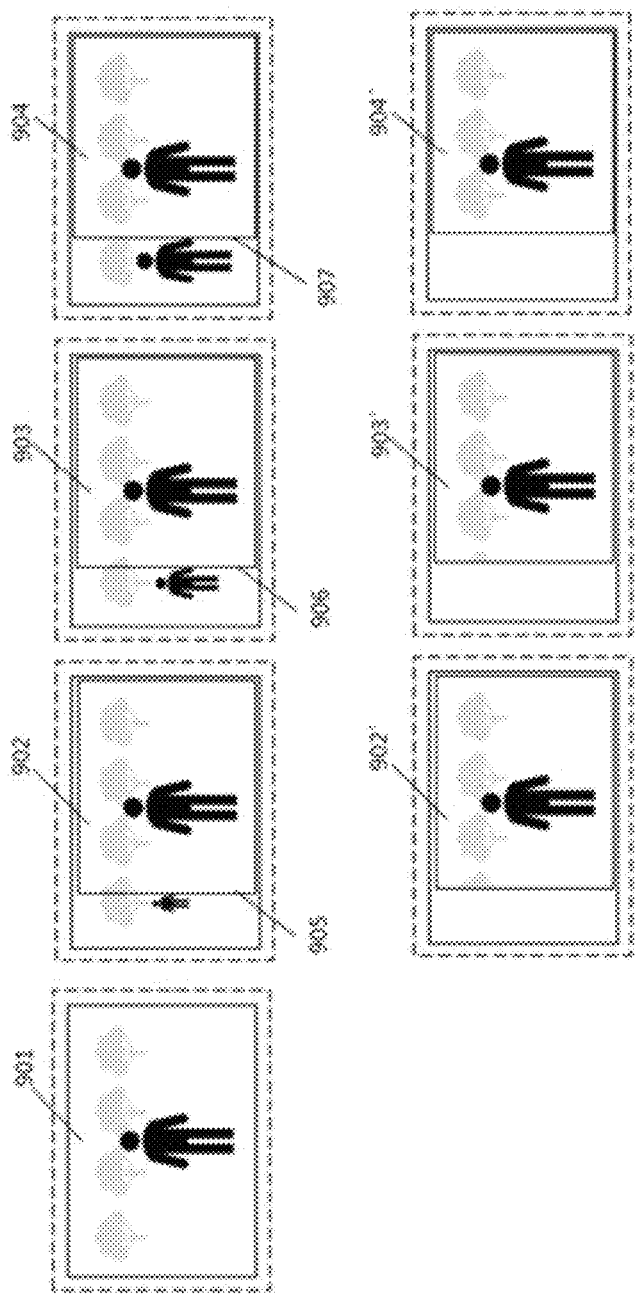
FIG. 9 depicts third exemplary frame-series images of a video for eliminating the intruder.

In some embodiments, FIG. 9 depicts third exemplary frame-series images of a video for eliminating the intruder. Referring to FIG. 9, images 901-904 are images taken by the general-purpose camera, while one intruder can be detected in each of images 902-904 in the exemplary frame-series images. The human body contour of the intruder in each of images 902-904 can be recognized respectively, and then each maximum image region excluding the intruder in each of images 902-904 can be determined to be blocks 905-907 respectively. Then images in blocks 905-907 can be processed to get images 902', 903', and 904' respectively by deleting the image pixels outside of blocks 905-907 in each of images 902-904 respectively. Then the new frame-series images of a video without the intruder, e.g. images 901, 902', 903', and 904', can be stored into the permanent storage. It can be understood that image pixels outside of blocks 905-907 in images 901-904 can be replaced with a specific pixel, such as a pixel in while or a pixel in black, etc.

Still referring to FIG. 9, in some embodiments, the size of blocks 905-907 can be revised by the user.

Figure 10:
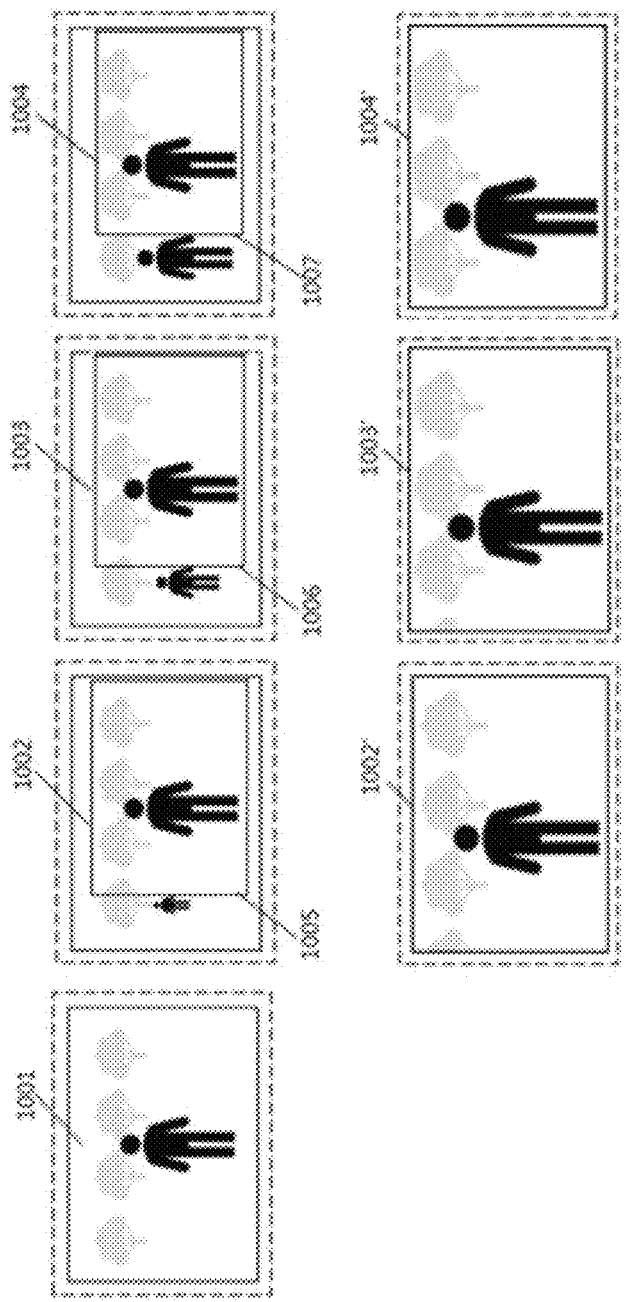
FIG. 10 depicts fourth exemplary frame-series images of a video for eliminating the intruder.

In a further embodiment, FIG. 10 depicts forth exemplary frame-series images of a video for eliminating the intruder. Referring to FIG. 10, blocks 905-907 in FIG. 9 can be revised into blocks 1005-1007 based on ratio of length to width of the screen size so that the video is recorded as if the focal length of the camera had been changed during videoing. In this implementation, the size of the block 1005 can be obtained firstly, then it can be found that the length of block 1005 is much less than the length of image 1001 comparing their width. So the width of the block 1005 can be reduced based on its length and the ratio of length to width of the screen size to get image 1002'. The other blocks, e.g. blocks 1006 and 1007, can be processed similarly to get images 1003' and 1004'. The image pixels outside of blocks 905-907 in images 901-904 can be deleted respectively. Then the new frame-series images of a video without the intruder, e.g. images 1001, 1002', 1003', and 1004', can be stored into the permanent storage.

Although a region with a rectangle block is applied in the embodiments shown in FIG. 8-9, it can be understood that a region with any kind of shape can be applied to present disclosure.

And it may be appreciated that the first image in the first frame-series images can be used to get the person to be included in the scene or can be set as the reference image.

Figure 11:
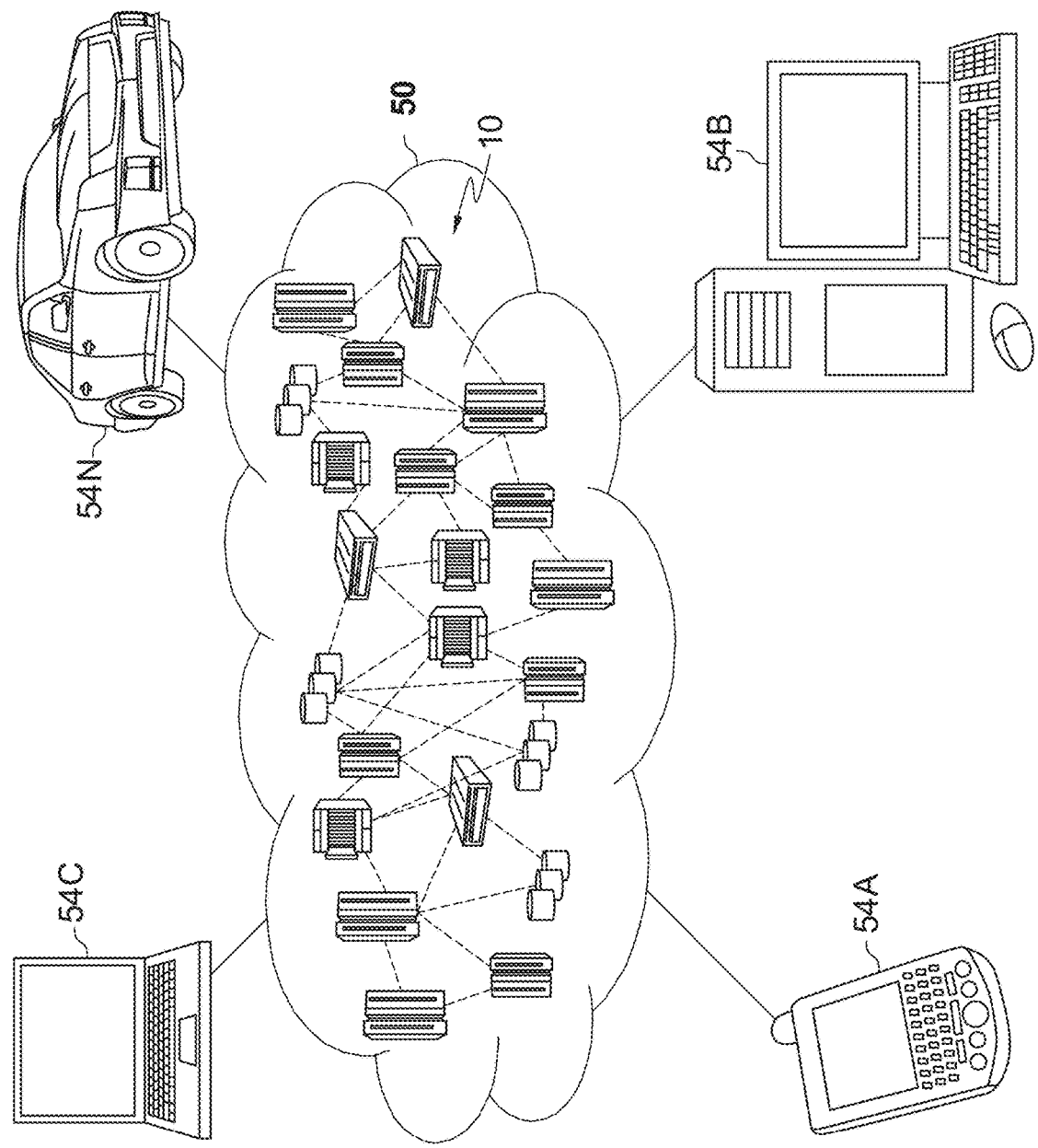
FIG. 11 depicts a cloud computing environment according to an embodiment of the present invention.

Referring to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that cloud computing nodes 10 and cloud computing environment 50 can communicate with any type of computerized device over any type of network and/or network addressable connection (e.g., using a web browser).

Figure 12:
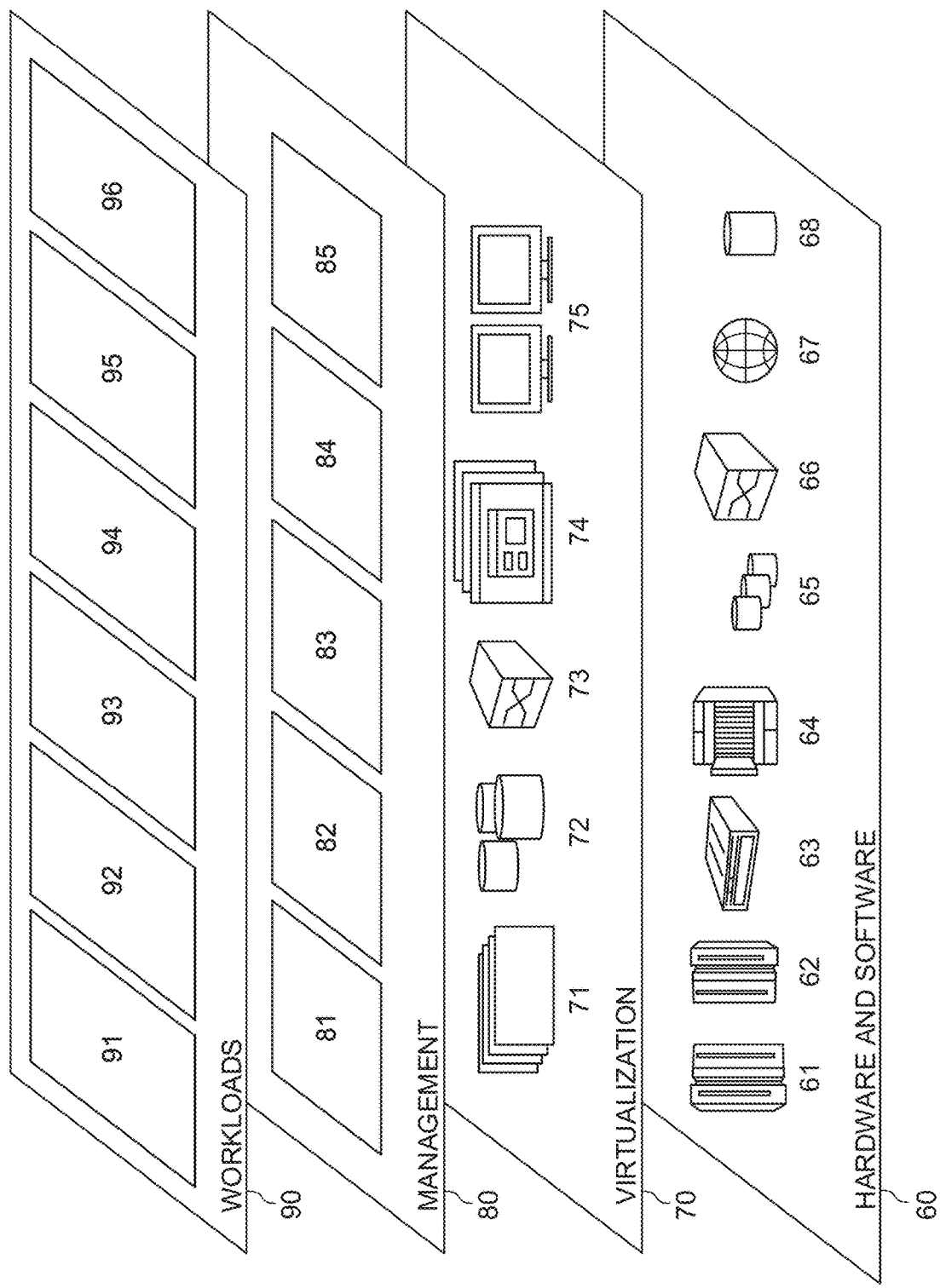
FIG. 12 depicts abstraction model layers according to an embodiment of the present invention.

Referring to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Intrusion Prevention 96. Intrusion Prevention 96 may detect and remove intruders from a captured video.

The present invention may be a system, a method, and/or a computer program product at any possible technical detail level of integration. The computer program product may include a computer-readable non-transitory storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for preventing intrusion during video recording or streaming using a device with a camera, the method comprising:
    capturing, by a camera of a device, a scene into a video;
    storing, by the device, frame-series images of the video into a cache;
    detecting, by the device, at least one intruder in the scene; and
    eliminating, by the device, the at least one intruder from the cached frame-series images in response to the at least one intruder being detected in the scene, wherein eliminating the at least one intruder from the cached frame-series images comprises:
        determining, by the device, at least one contour of the at least one intruder;
        determining, by the device, a region excluding the at least one contour;
        generating, by the device, a new image based on the region; and
        modifying, by the device, the length and the width of the new image so the video is recorded or streamed as if the focal length of the camera had been changed during videoing or streaming.

2. The method of claim 1, further comprising:
    enabling, by the device, the cached frame-series images without the intruder to be viewed.

3. The method of claim 1, wherein the device further comprises an infrared camera to capture duplicate frame-series images for the scene, and the duplicate frame-series images for the scene taken by the infrared camera are used to detect the at least one intruder in the scene.

4. The method of claim 1, wherein detecting, by the device, the at least one intruder in the scene comprises:
    determining, by the device, a reference image in the frame-series images in which there is at least one object to be included in the scene;
    determining, by the device, a first count of the object(s) to be included in the scene for the reference image;
    determining, by the device, a second count of object(s) included in the scene for a second image in the frame-series images; and
    determining, by the device, there is at least one intruder in the second image in response to the second count being bigger than the first count.

5. The method of claim 1, wherein detecting, by the device, the at least one intruder in the scene comprises:
    receiving a user input identifying the intruder.

6. The method of claim 1, wherein the user input comprises a closed curve drawn by the user on a display screen of the device.

7. A computing system for preventing intrusion during video recording or streaming, the computer system comprising a computer processor coupled to a computer-readable memory unit, the computer-readable memory unit comprising instructions that when executed by the computer processor implements a method comprising:
    capturing, by a camera of a device, a scene into a video;
    storing, by the device, frame-series images of the video into a cache;
    detecting, by the device, at least one intruder in the scene; and
    eliminating, by the device, the at least one intruder from the cached frame-series images in response to the at least one intruder being detected in the scene, wherein eliminating the at least one intruder from the cached frame-series images comprises:
        determining, by the device, at least one contour of the at least one intruder;
        determining, by the device, a region excluding the at least one contour;
        generating, by the device, a new image based on the region; and
        modifying, by the device, the length and the width of the new image so the video is recorded or streamed as if the focal length of the camera had been changed during videoing or streaming.

8. The computer system of claim 7, the method further comprising:
    enabling, by the device, the cached frame-series images without the intruder to be viewed.

9. The computer system of claim 7, wherein the device further comprises an infrared camera to capture duplicate frame-series images for the scene, and the duplicate frame-series images for the scene taken by the infrared camera are used to detect the at least one intruder in the scene.

10. The computer system of claim 7, wherein detecting, by the device, the at least one intruder in the scene comprises:
   determining, by the device, a reference image in the frame-series images in which there is at least one object to be included in the scene;
   determining, by the device, a first count of the object(s) to be included in the scene for the reference image;
   determining, by the device, a second count of object(s) included in the scene for a second image in the frame-series images; and
   determining, by the device, there is at least one intruder in the second image in response to the second count being bigger than the first count.

11. The computer system of claim 7, wherein detecting, by the device, the at least one intruder in the scene comprises:
   receiving a user input identifying the intruder.

12. The computer system of claim 7, wherein the user input comprises a closed curve drawn by the user on a display screen of the device.

13. A computer program product for preventing intrusion during video recording or streaming, the computer program product comprising a computer readable storage medium having program instructions embodied therewith, the program instructions executable by one or more processors to cause the one or more processors to perform an operation comprising:
   capturing, by a camera of a device, a scene into a video;
   storing, by the device, frame-series images of the video into a cache;
   detecting, by the device, at least one intruder in the scene; and
   eliminating, by the device, the at least one intruder from the cached frame-series images in response to the at least one intruder being detected in the scene, wherein eliminating the at least one intruder from the cached frame-series images comprises:
      determining, by the device, at least one contour of the at least one intruder;
      determining, by the device, a region excluding the at least one contour;
      generating, by the device, a new image based on the region; and
      modifying, by the device, the length and the width of the new image so the video is recorded or streamed as if the focal length of the camera had been changed during videoing or streaming.

14. The computer program product of claim 13, the operation further comprising:
   enabling, by the device, the cached frame-series images without the intruder to be viewed.

15. The computer program product of claim 13, wherein the device further comprises an infrared camera to capture duplicate frame-series images for the scene, and the duplicate frame-series images for the scene taken by the infrared camera are used to detect the at least one intruder in the scene.

16. The computer program product of claim 13, wherein detecting, by the device, the at least one intruder in the scene comprises:
   determining, by the device, a reference image in the frame-series images in which there is at least one object to be included in the scene;
   determining, by the device, a first count of the object(s) to be included in the scene for the reference image;
   determining, by the device, a second count of object(s) included in the scene for a second image in the frame-series images; and
   determining, by the device, there is at least one intruder in the second image in response to the second count being bigger than the first count.

17. The computer program product of claim 13, wherein detecting, by the device, the at least one intruder in the scene comprises:
   receiving a user input identifying the intruder.

18. The computer program product of claim 13, wherein the user input comprises a closed curve drawn by the user on a display screen of the device.

* * * * *